United States Patent
Xiao et al.

(10) Patent No.: US 11,498,378 B2
(45) Date of Patent: Nov. 15, 2022

(54) SPECIAL SUSPENSION-TYPE TRACKED UNDERWATER ROBOT ADAPTABLE TO ULTRA-SOFT GEOLOGICAL CONDITIONS

(71) Applicant: SHANGHAI JIAO TONG UNIVERSITY, Shanghai (CN)

(72) Inventors: Longfei Xiao, Shanghai (CN); Jianmin Yang, Shanghai (CN); Guocheng Zhao, Shanghai (CN); Tao Peng, Shanghai (CN); Lei Tang, Shanghai (CN); Haining Lu, Shanghai (CN); Mingyue Liu, Shanghai (CN); Yufeng Kou, Shanghai (CN); Weijie Zhao, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 619 days.

(21) Appl. No.: 16/597,456

(22) Filed: Oct. 9, 2019

(65) Prior Publication Data

US 2020/0086705 A1    Mar. 19, 2020

Related U.S. Application Data

(63) Continuation of application No. PCT/CN2018/116809, filed on Nov. 21, 2018.

(30) Foreign Application Priority Data

Feb. 2, 2018  (CN) .......................... 201810106189.0
May 29, 2018  (CN) .......................... 201810527159.7
Oct. 8, 2018  (CN) .......................... 201811167706.1

(51) Int. Cl.
*B60F 3/00*  (2006.01)
*B62D 55/14*  (2006.01)
*B62D 55/253*  (2006.01)

(52) U.S. Cl.
CPC ............ *B60F 3/0015* (2013.01); *B62D 55/14* (2013.01); *B62D 55/253* (2013.01)

(58) Field of Classification Search
CPC ..... B60F 3/0015; B62D 55/14; B62D 55/062; B62D 55/065; B62D 55/253
See application file for complete search history.

(56) References Cited

U.S. PATENT DOCUMENTS 3,842,785 A * 10/1974 Rivet .................... B60F 3/0015
                                                        305/120
5,848,595 A * 12/1998 Arthur ............... B65D 85/1081
                                                        131/238

(Continued)

FOREIGN PATENT DOCUMENTS

CN    102941783 A    2/2013
CN    103085900 A    5/2013

(Continued)

OTHER PUBLICATIONS

International Search Report in corresponding PCT Application No. PCT/CN2018/116809, dated Feb. 26, 2019.

(Continued)

*Primary Examiner* — Tony H Winner
(74) *Attorney, Agent, or Firm* — Leason Ellis LLP

(57) ABSTRACT

A special suspension-type tracked underwater robot adaptable to ultra-soft geological conditions comprises traveling mechanisms, wherein the traveling mechanisms are track-mud sled structures, the mud sled structures are fixedly arranged on two sides of each track, and the bottoms of the mud sled structures are higher than the bottoms of the tracks and are provided with arched plate heads; the arched plate heads are provided with plate water-jet devices capable of spraying water forwards; and in the traveling process of the traveling mechanisms, and the arched plate heads press water downwards to form a water film at the bottoms of the (Continued)

mud sled structures together with the water sprayed by the plate water-jet devices, so that the traveling mud resistance is reduced, and the robot can stably advance under ultra-soft geological conditions. The special suspension-type tracked underwater robot further comprises a propelling mechanism, an adjustment device, an operating module, and the like, can autonomously advance on a seabed, can suspend in water, can repair itself when broken, and can achieve detailed operations.

19 Claims, 7 Drawing Sheets

(56) References Cited

U.S. PATENT DOCUMENTS

| | | | | |
|---|---|---|---|---|
| 6,482,053 | B1* | 11/2002 | Prestenbach | B62D 55/286 440/12.63 |
| 7,798,261 | B1* | 9/2010 | Rittenhouse | B60L 7/06 180/9.1 |
| 9,162,545 | B1 | 10/2015 | Wilson | |
| 2009/0152037 | A1* | 6/2009 | Brazier | B62D 55/07 180/191 |
| 2018/0162467 | A1* | 6/2018 | Correa | B60F 3/0015 |

FOREIGN PATENT DOCUMENTS

| | | |
|---|---|---|
| CN | 103843507 A | 6/2014 |
| CN | 106143841 A | 11/2016 |
| CN | 205906088 U | 1/2017 |
| CN | 206000537 U | 3/2017 |
| CN | 107499479 A | 12/2017 |
| CN | 108382550 A | 8/2018 |
| CN | 108909860 A | 11/2018 |
| CN | 208325436 U | 1/2019 |

OTHER PUBLICATIONS

Written Opinion of corresponding International application PCT/CN2018/116809, dated Feb. 26, 2019, with English translation.

* cited by examiner

SPECIAL SUSPENSION-TYPE TRACKED UNDERWATER ROBOT ADAPTABLE TO ULTRA-SOFT GEOLOGICAL CONDITIONS

BACKGROUND OF THE INVENTION

1. Technical Field

The invention relates to a track traveling mechanism, in particular to a track traveling structure adaptable to ultra-soft underwater geological environments, and a robot.

2. Description of Related Art

In the prior art, track shoes are arranged on tracks to increase the friction so as to improve the thrust. However, these track shoes are generally have a small height, which in turns leads to an unsatisfactory effect; and these track shoes are also very short, silt may enter the gaps between the track shoes, and consequentially, the track shoes cannot be easily pulled out of mud; and with the increase of the length of the track shoes, it will be more difficult to remove mud between the track shoes. Nowadays, the angle of the track shoes is set to fulfill the purpose of gravity-based mud removal, while the mud removal effect still remains unsatisfactory. Underwater traveling mechanisms generally have a high ground pressure requirement which is difficult to meet. Generally, the horizontal width of the tracks is increased to enlarge the contact area and to improve the stability; or, the ground contact area is enlarged by means of an additional structure. But, the problem of the increase of the frictional resistance still remains unsolved.

In addition, existing seabed operation vehicles have the following defects:

1) The existing seabed operation vehicles cannot suspend or float and has to be launched and recovered by means of a mother ship during work, and consequentially, the cost is high, and the efficiency is low.

2) The existing seabed operation vehicles are equipped with a track mechanism, but is not equipped with a floating device, and thus has to work close to the seabed and to move on the seabed at three degrees of freedom by means of tracks and other devices. When moving on certain submarine terrains such as steep slopes, the seabed operation vehicles have to advance with high power, which may damage the engine and reduce the system reliability. Due to the incapability of free attitude adjustment on complex and changeable submarine terrains, the existing seabed operation vehicles may collide with obstacles and will be damaged.

3) It is difficult to achieve underwater photography through the existing submarine mining equipment. Due to the complex structure of the existing submarine mining equipment, multiple underwater cameras have to be mounted to realize all-directional and multi-angle detailed photography of the submarine environment, and this puts forward a high requirement for the structural configuration of the existing seabed operation vehicles and increases the design difficulty of the equipment and the investment of manpower and material resources.

4) Due to the lack of a mechanical arm, the existing seabed operation vehicles cannot removal obstacles and thus can only collect minerals on a flat seabed; and the mining equipment cannot collect minerals which are covered with stones or other impurities, and the collector may be damaged if forced to perform mineral collection in this case.

BRIEF SUMMARY OF THE INVENTION

The objective of the invention is to provide a special suspension-type tracked underwater robot adaptable to ultra-soft geological conditions. According to the special suspension-type tracked underwater robot adaptable to ultra-soft geological conditions, track water-jet devices are arranged to remove mud between track shoes, so that the height of the track shoes can be increased, and the track shoes can be pulled out of the mud more easily; and meanwhile, mud sled structures are arranged for pressure distribution, plate water-jet devices are arranged on the mud sled structures, and a water film is formed below mud sleds to reduce the frictional resistance between the mud sled structure and the ground in the traveling process. Meanwhile, the invention provides a multi-functional underwater robot adopting a track traveling structure. The multi-functional underwater robot can be launched and recovered without a mother ship, can achieve six-degree-of-freedom underwater movement to effectively avoid obstacles, can realize wide-angle underwater photography to detect the submarine terrain and to search out a proper mining area, and can remove obstacles such as stones when working in the mining area, thereby improving the mineral collection efficiency and quality.

The following technical solution is adopted by the invention:

A special suspension-type tracked underwater robot adaptable to ultra-soft geological conditions comprises traveling mechanisms, wherein the traveling mechanisms are track-mud sled structures, mud sled structures are fixedly arranged on two sides of each track, and the bottoms of the mud sled structures are higher than the bottoms of the tracks and are provided with arched plate heads; the arched plate heads are provided with plate water-jet devices capable of spraying water forwards; and in the traveling process of the traveling mechanisms, the arched plate heads press water downwards to form a water film at the bottoms of the mud sled structures together with the water sprayed by the plate water-jet devices, and thus, the mud resistance is reduced.

Furthermore, extended track shoes are arranged on the tracks, and track water-jet devices aligned to gaps between the adjacent track shoes are fixedly arranged on track traveling structures to flush away mud between the adjacent track shoes.

Furthermore, the special suspension-type tracked underwater robot further comprises a support beam and a power mechanism, wherein the traveling mechanisms are arranged on two sides of the support beam, and the support beam is connected to track traveling mechanism side panels.

Furthermore, the mud sled structures are fixedly connected with the track traveling mechanism side panels.

Furthermore, the power mechanism is composed of a waterproof motor case and an electrical cabinet.

Furthermore, each track comprises a rubber track body, track shoes, a plurality of track rollers, a driving gear, a guide wheel assembly, track traveling mechanism side panels, and track water-jet devices, wherein the rubber track body is connected with the track shoes, the plurality of track rollers are evenly distributed, and two track water-jet devices are horizontally welded to a waterproof motor case behind a support beam.

Furthermore, the mud sled structures comprise arched plate heads and arched plate tails, baffle plates are arranged on side faces of the mud sled structures, and the plate water-jet devices are integrally mounted on the arched plate heads.

Furthermore, the special suspension-type tracked underwater robot further comprises a collection box, a floating mechanism and a control mechanism, wherein the traveling mechanisms are arranged at the bottoms of the track traveling structures, the collection box is arranged on the track traveling structures, an operating module and a propelling mechanism are respectively arranged on the head and the tail of the collection box, the operating module is used for collecting minerals and then conveying the minerals into the collection box, the floating mechanism comprises a plurality of adjustable buoyant airbags which are horizontally and symmetrically distributed at the top of the collection box, and the control mechanism is connected with the traveling mechanisms, the operating module, the propelling mechanism and the adjustable buoyant airbags.

Furthermore, each adjustable buoyant airbag comprises an airbag body and a membrane arranged in the middle of the interior of the airbag body and dividing an inner cavity of the airbag body into a first cavity and a second cavity, wherein two-way air valves are arranged at the first cavity and the second cavity and are connected with the control mechanism.

Furthermore, the airbag bodies are made of nylon materials.

Furthermore, the operating module comprises a submarine adaptive collector, water suction tubes, and a plurality of mineral inlets formed in the head of the collection box and communicated with the collection box, and the submarine adaptive collector is connected with the mineral inlets via the water suction tubes.

Furthermore, telescopic adjustment mechanisms are arranged at the mineral inlets and are connected with the water suction tubes to adjust the length of the water suction tubes.

Furthermore, the propelling mechanism comprises two propellers symmetrically arranged on two sides of the tail of the collection box and respectively connected with two driving motors, and a filter screen is arranged in the collection box.

Furthermore, a horizontal platform is arranged on the head of the collection box and is provided with a mechanical arm having six degrees of freedom, and a mechanical gripper and/or camera are/is connected to a suspension end of the mechanical arm.

Furthermore, a position finder and an attitude sensor are mounted on the collection box, and the attitude sensor comprises a three-axis gyroscope and a tri-axial accelerometer.

Furthermore, a flared opening which becomes larger gradually from top to bottom is formed in the center of a chassis of the robot, the collection box 2 is of an annular structure in which a columnar space is defined, a water inlet is formed in the upper end of the columnar space, a water outlet is formed in the lower end of the columnar space, and a propeller 8 is arranged at the water inlet to guide water into the columnar space; and a slightly-tilted baffle plate 1018 is fixedly arranged below the columnar space, and under the effect of the baffle plate 1018, water flows out along the small-curvature chassis in the water outflow direction of the water outlet to form a water film between the chassis and sea mud.

Furthermore, a filter screen 21 is arranged on the inner wall of the annular collection box 2, and collection ports 26 are formed in the outer wall of the annular collection box 2; and during collection, water flows out along the small-curvature chassis under the effect of the baffle plate 1018 after flowing out along the inner wall of the collection box 2, so that the water film formed between the chassis and the sea mud is further reinforced.

Furthermore, the baffle plate 1018 can be freely stretched to shield the water outlet to different degrees and to adjust the water outflow direction.

Furthermore, distance sensors and image recognition sensors are arranged at the collection ports 26, and flowmeters are arranged in collection tubes connected with the collection ports 26; after image recognition, the control system reads the geometrical characteristics of collected objects so as to figure out the attributes and categories of the objects and to obtain the sizes and volumes of the collected objects, the weight and buoyancy of the objects are worked out according to the categories of the objects, and the minimum suction force is figured out according to the difference between the weight and the buoyancy; and afterwards, the control system adjusts the distance from the collection tubes to the collected objects and the flow rate in the collection tubes to dynamically adjust the suction force of the collection tubes to the collected objects under different working conditions, so that the suction force is kept close to the minimum suction force required to collect the objects.

A working method of the robot comprises the following steps:

S1: opening the two-way air valves of all the adjustable buoyant airbags to make sure that the buoyancy of the robot is slightly lower than the gravity of the robot;

S2: adjusting the diving speed and attitude of the robot;

S3: starting the propellers, controlling the propellers 71 to rotate forward or in reverse or to rotate at a variable speed to enable the robot to advance, retreat, or steer to reach a specified submarine mining area;

S4: shutting down the driving motors when the robot arrives at a seabed, stopping the propellers, and starting the traveling mechanisms to enable the robot to continuously and stably advance on the seabed by means of track wheel devices;

S5: starting the mechanical arm, and controlling the mechanical gripper to pick up impurities such as stones on minerals and then to place the impurities in a specified position;

S6: after the impurities in the mining area are removed, launching the water suction tubes and the submarine adaptive collector to a specified position, and starting the driving motors to enable the propellers to rotate at a high speed to generate a great suction force so as to collect the minerals into the collection box, and continuously discharging water out of the collection box when the propellers arranged in the collection box rotate at a high speed, so that the pressure in the collection box is reduced, and external water flows into the collection box via the collection tubes, wherein the propellers rotating in the collection box can serve as a water pump with a storage function; and S7: conveying the minerals into a buffer compartment by a pulp pump, and driving the robot to ascend after one working cycle is completed or the working system is shut down.

Furthermore, S2 particularly comprises: opening the two-way air valves to allow air to enter the airbag bodies to keep the volume of the airbag bodies constant to ensure continuous diving of the robot, wherein the diving speed is determined according to the position finder; and the air inflow of part of the airbags can be appropriately increased according to the longitudinal inclination and the horizontal inclination of the attitude sensor to keep the robot in an upright condition.

The invention has the following beneficial effects:

As for the track traveling mechanisms:

1) The water-jet devices are arranged in the mud sled structures to spray water onto the plate bottom, so that a water film is formed under the wall attachment effect, and the traveling resistance is greatly reduced;

2) The track-mud sled structures are adopted to better adapt to the submarine environments;

3) The tracks are provided with extended track shoes and thus can stretch deep into submarine sediment to generate a greater driving force, to reduce subsidence, and to prevent slipping, and thus, the transport capacity is improved; and the extended track shoes are used in cooperation with the track water-jet devices used for flushing, so that mud is prevented from being accumulated between the adjacent extended track shoes;

4) The water-jet devices are mounted on the tail of the tracks to flush away mud or other attachments adhering to toothed plates, which may otherwise reduce the driving force of the tracks and increase the weight of the tracks;

5) The mud sled structures are adopted, so that the ground contact area is enlarged, the ground pressure is reduced, the balance is improved, and the traveling stability is improved;

6) The baffle plates on the two sides of the mud sled structures and the side panels of the tracks can prevent mud or other attachments from being drawn into track drive devices, so that the reliability of the robot is improved.

As for the robot:

1) The floating mechanism is formed by the adjustable buoyant airbags, the two-way air valves can be controlled to open or close to change the air inflow of the floating mechanism, and thus, the robot can obtain different buoyancy forces to float or suspend in water during work; and different from traditional submarine mining equipment, the robot can be launched before work and recovered after work without a mother ship, so that the working time and the task cycle are shortened, and manpower and material costs are greatly reduced.

2) Multiple adjustable buoyant airbags are horizontally and symmetrically arranged at the top of the collection box, a membrane is arranged in the middle of the interior of each adjustable buoyant airbag to equally divide the airbag into a first cavity and a second cavity, and the adjustable buoyant airbags can obtain different buoyancy forces in the horizontal direction and the vertical direction by means of the difference between the air inflow in the horizontal direction and the air inflow in the vertical direction, so that the underwater robot can swing horizontally and vertically to achieve six-degree-of-freedom underwater motions and can avoid obstacles more flexibly and effectively to reduce collision and abrasion.

3) Two driving motors are used to respectively control the rotation speed of two propellers, and in the suspension or floating state, the propellers rotate forward or in reverse or rotate at a variable speed to enable the robot to advance or steer, so that the robot can adapt to submarine terrains and environmental loads more flexibly when operating underwater.

4) A great suction force formed by high-speed rotation of the propellers is used to collect minerals through the submarine adaptive collector and can be controlled by adjusting the rotation speed of the propellers; and through such design, a power device and an operating device are integrated, so that a working pump used for collecting minerals is not needed anymore, and the weight of the robot is greatly reduced; and compared with traditional mining equipment, the submarine mining robot can store and transport more minerals.

5) The mechanical arm having six degrees of freedom is installed, so that the robot can operate underwater at any position and any attitude; and the mechanical gripper and/or camera are/is mounted on the front section of the mechanical arm and can be changed in real time according to actual work requirements to realize all-directional and wide-angle photography and to remove obstacles, so that the submarine adaptive collector can collect minerals more efficiently and can repair itself if breaking down during submarine work.

Reference Signs: 101, support beam; 102, power mechanism; 103, traveling mechanism; 104, track device; 105, mud sled structure; 106, rubber track body; 107, track shoe; 108, track roller; 109, driving wheel; 1010, guide wheel assembly; 1011, track traveling mechanism side panel; 1012, track water-jet device; 1013, arched plate head; 1014, baffle plate; 1015, plate water-jet device; 1016, waterproof motor case; 1017, electrical cabinet; 1018, baffle plate; 1019, flared water-jet opening; 2, water tank; 9, waterproof distribution box; 10, camera; 21, filter screen; 26, collection port; 27, water inlet; 28, water outlet.

DETAILED DESCRIPTION OF THE INVENTION

The invention is further explained below in combination with the accompanying drawings and embodiments.

Embodiment 1

Figure 1:
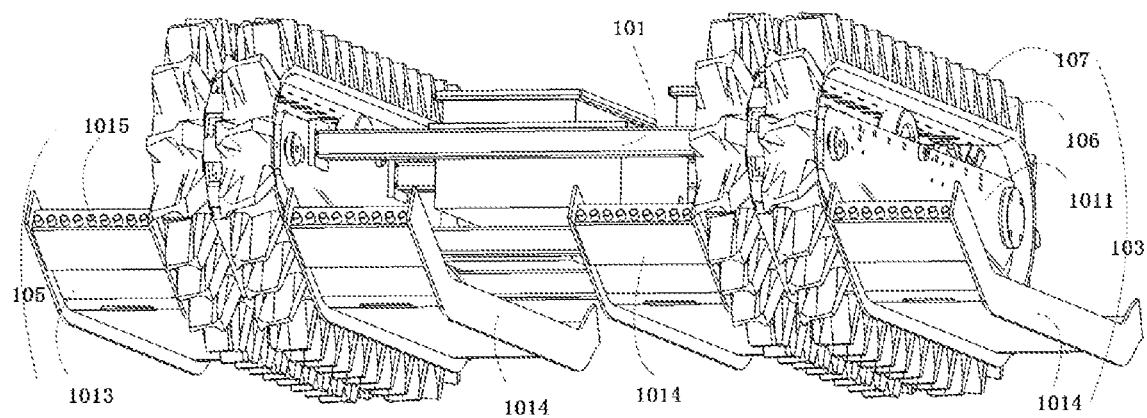
FIG. 1 is a perspective view of a chassis of an underwater robot in Embodiment 1.
Figure 2:
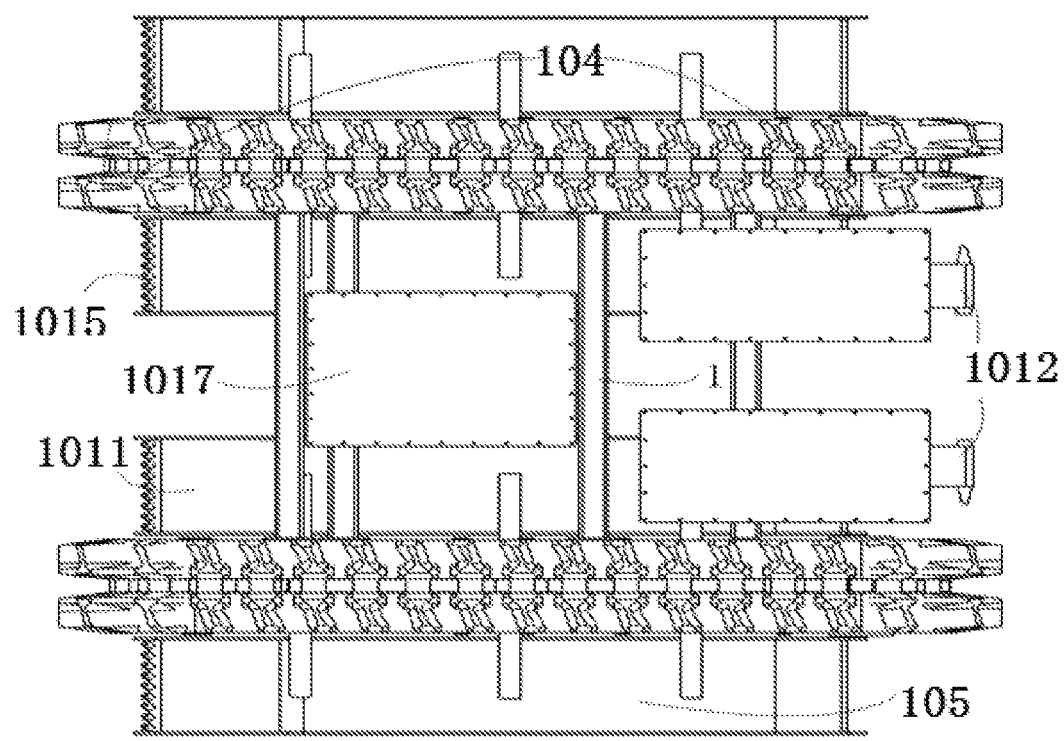
FIG. 2 is a top view of the chassis of the underwater robot in Embodiment 1.
Figure 3:
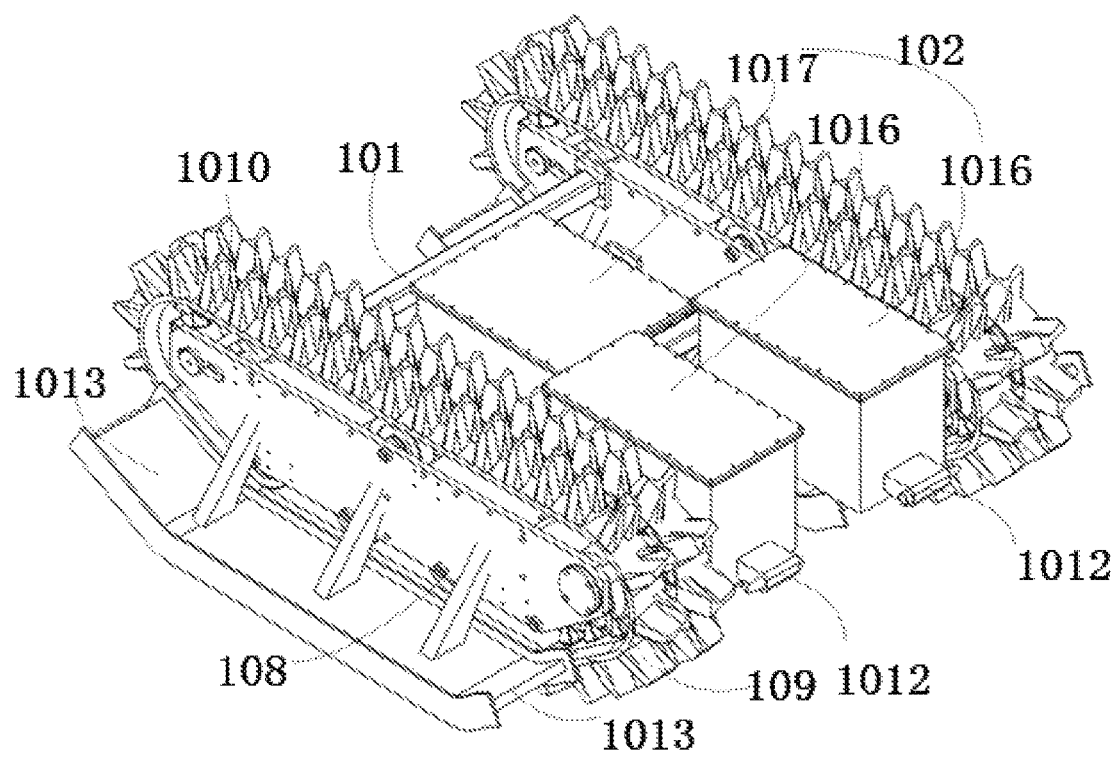
FIG. 3 is another perspective view of the chassis of the underwater robot in Embodiment 1.

In this embodiment, as shown in FIG. 1-FIG. 3, a track adaptable to ultra-soft underwater terrestrial environments is used to travel on a seabed or under other ultra-soft geological conditions. The track is a sled-type track and comprises a rubber track body 106, track shoes 107, track rollers 108, a driving gear 109, a guide wheel assembly 1010, track traveling mechanism side panels 1011, track water-jet devices 1012, and the like.

The rubber track body 106 is composed of track links and track pins, wherein the track links are connected through the track pins to form a circular track chain; each track link has two ends provided with holes and is able to be engaged with the driving gear, and guide teeth are arranged in the middle of each track link and are used to rectify the track and to prevent the track from falling from a track traveling device when the device steers or travels in a tilting manner, so that the traveling stability of the robot is improved.

The track shoes 107 are fixed to the lower portion of the rubber track body and are longer than common track shoes, and the structural strength and other properties of the track shoes 107 are also improved, so that the track traveling device can better adapt to the soft submarine geological condition and can stretch deeper into seabed mud to provide a greater driving force and to achieve higher driving efficiency.

The two water-jet devices 1012 are welded to the two sides of the tail of a waterproof motor case 1016 and can generate a high-speed water jet flow which exactly flows through the roots of the track shoes to flush away sea mud adhering to the surfaces of the track shoes. With the flushing effect of the water-jet devices, the track shoes of the track can be made longer to stretch deep into submarine sediment to generate a greater driving force, to reduce subsidence, and to prevent slipping, and thus, the transport capacity is improved.

The track rollers 108 are located on the rubber track body and are engaged with the inner surface of the rubber track body to bear the weight of a tank and to rectify the track. Each track roller 108 is composed of a hub, a roller disk, a belt, a sphere bearing, an axle cover, a retaining nut, and the like. The device is provided with a plurality of track rollers 108, so that the gravitational force borne by each track roller is small, the pressure is distributed on the track more uniformly, and the trafficability and maneuverability of the device are improved.

The driving gear 109 is located on the upper portion of the front end of the track, is composed of a hub, a gear ring, a toothed washer, a conical tooth cup, a retaining nut and a stopper bolt, and is engaged with the track through a gear to transmit power from a side reducer to the track so as to drive the device to move.

The guide wheel assembly 1010 is located on the outer side of the tail of the track, is used to guide and support the track and to adjust the tightness of the track together with an adjuster, and is composed of a hub, a wheel disk, a sphere bearing, an axle cover, a retaining nut, a double-row sphere bearing, a support cup, and the like.

The track traveling mechanism side panels 1011 are located on the two sides of the track and are connected to a mud sled structure 105 at the bottom through a support beam. The side panels can prevent external objects from entering the track and can fix the multiple track rollers in the track to keep the relative positions of the track rollers constant, and thus, the traveling stability is improved.

The device is provided with the mud sled structure 105 including an arched plate head 1013 and an arched plate tail. Compared with similar devices provided with flat mud sleds or devices not provided with mud sleds, the device has a larger contact area with soft mud when sinking in the soft mud to the same extent as other devices, and accordingly, the lift force applied to mud sleds in soft mud environments is improved, and the device can bear a greater load. Baffle plates 1014 are arranged on two sides and the front portion of the mud sled structure 105 to prevent mud from being splashed into the device.

The arched plate head 1013 is provided with a plate water-jet device 1015 capable of spraying a high-pressure water flow along the bottom of the arched plate head 1013. In the traveling process of the whole device, the water flow flows to the bottom of the mud sled structure 105 along the bottom of the arched plate head 1013 under the wall attachment effect so as to form a water film at the bottom of the mud sled to isolate the mud sled from the muddy ground, and accordingly, the frictional resistance between mud and the mud sled is reduced; and the rate of the water-jet flow can be dynamically adjusted according to the advancing speed of the track traveling structure.

The basic conception of the robot is as follows: the submarine mining efficiency is improved by means of multi-functional integration and cooperative work of a floating mechanism, an operating module, a submarine adaptive collector, a mechanical arm, and other systems according to the characteristics of submarine mining operations, and the capacity to adapt to the complex submarine terrains, ocean current loads, and operating conditions is also improved.

Figure 4:
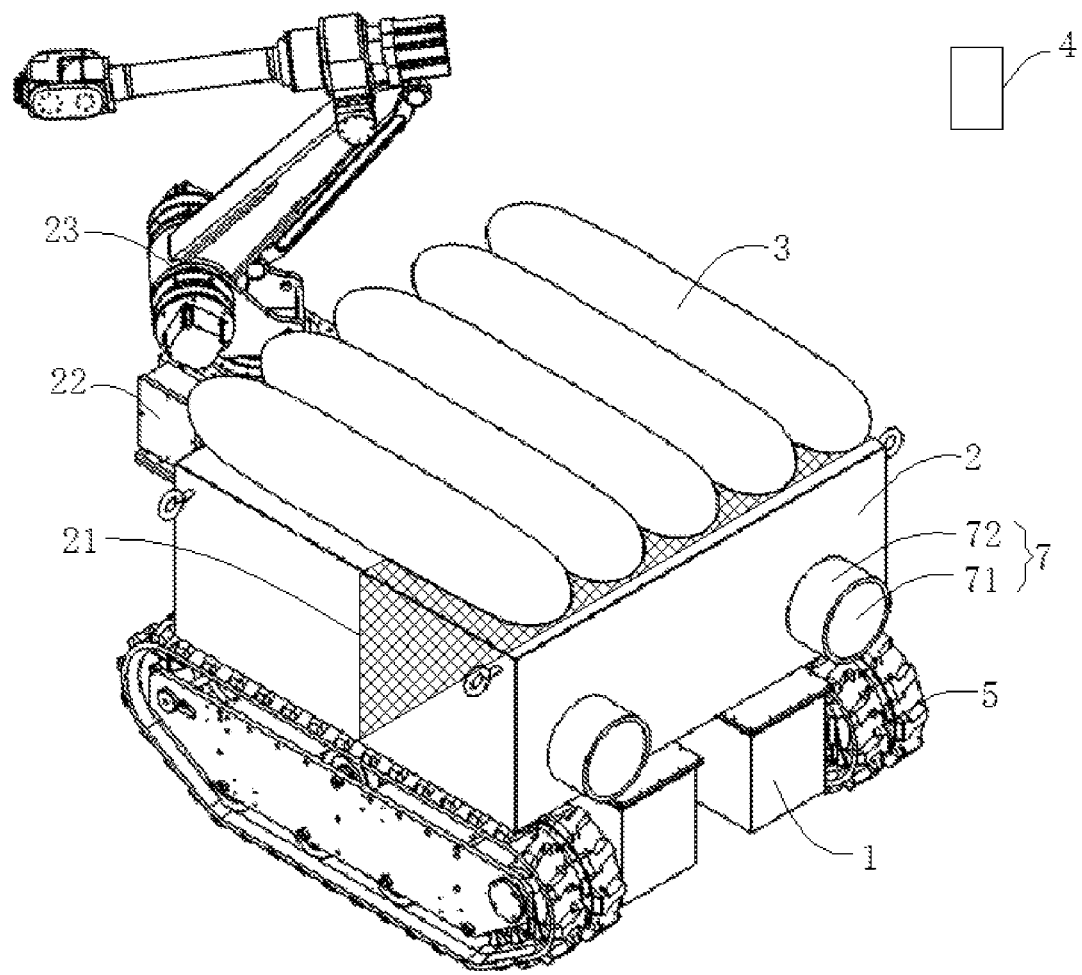
FIG. 4 is a schematic diagram the underwater robot in Embodiment 1.
Figure 5:
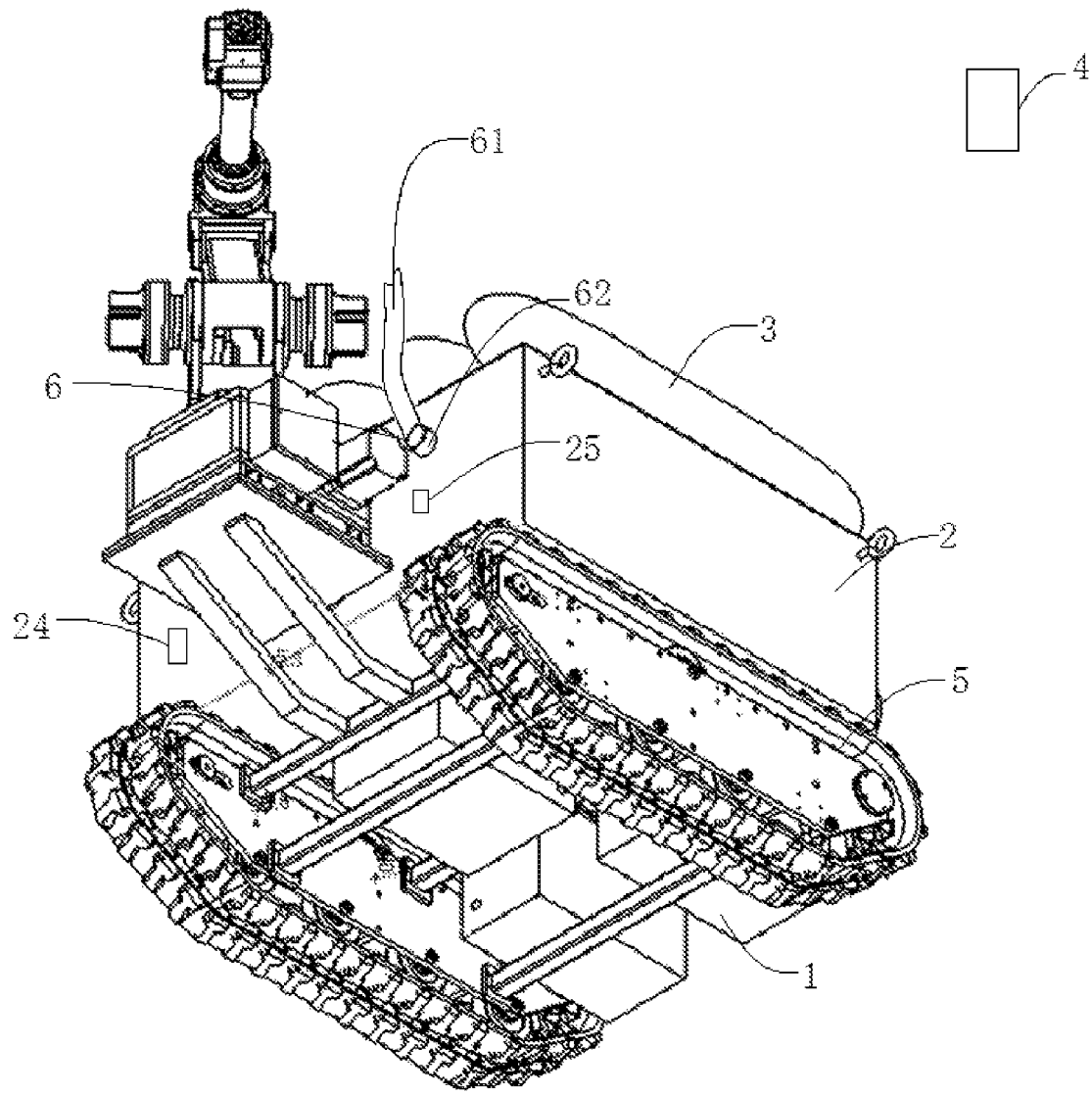
FIG. 5 is another schematic diagram of the underwater robot in Embodiment 1.
Figure 6:
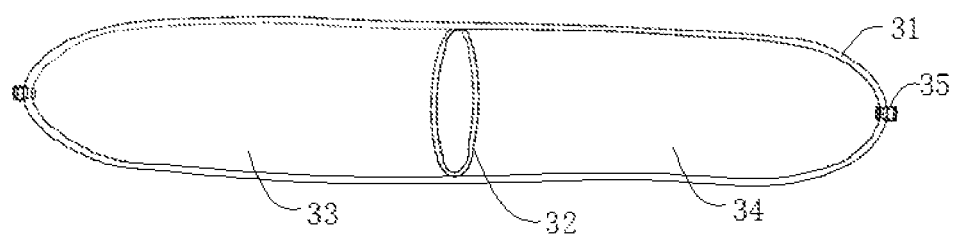
FIG. 6 is a structural diagram of a floating mechanism of the underwater robot in Embodiment.

Referring to FIG. 4-FIG 6, a multi-functional underwater robot of the invention comprises track traveling mechanisms 1, a collection box 2, a floating mechanism 3 and a control mechanism 4, wherein traveling mechanisms 5 are arranged at the bottoms of the track traveling mechanisms 1, the collection box 2 is arranged on the track traveling mechanisms 1, an operating module 6 and a propelling mechanism 7 are respectively arranged on the head and the tail of the collection box 2, and the operating module 6 is used for collecting minerals and then conveying the minerals into the collection box 2; the floating mechanism 3 comprises a plurality of adjustable buoyant airbags which are horizontally and symmetrically distributed at the top of the collection box 2; and the control mechanism 4 is connected with the traveling mechanisms 5, the operating module 6, the propelling mechanism 7 and the adjustable buoyant airbags. The traveling mechanisms 5 in the invention are track wheel devices capable of stably moving and resisting interferences from environmental loads such as ocean currents, and the rotation speed and rotation direction of two track driving motors can be changed to realize advancing, retreating or steering of the robot.

Particularly, each adjustable buoyant airbag comprises an airbag body 31 and a membrane 32, wherein the membrane is arranged in the middle of the interior of the airbag body and divides an inner cavity of the airbag body 31 into a first cavity 33 and a second cavity 34, and two-way air valves 35 are arranged at the first cavity 33 and the second cavity 34 and are connected with the control mechanism 4. In this embodiment, the airbag bodies 31 are made from nylon materials and have good deformation performance and high tensile strength, thereby being able to largely deform to generate buoyancy and not being prone to cracks when deforming in a deep-sea high-pressure environment.

The adjustable buoyant airbags of the invention have the following functions: (1) to fulfill the suspension and floating functions of the submarine mining robot; (2) to guarantee the attitude adjustment and six-degree-of-freedom underwater motions of the robot. Particularly, when the robot works, the two-way air valves 35 are controlled by the control mechanism 4 to open or close to control the quantity of compressed air in the airbag bodies 31, so that the robot obtains different buoyancy forces to suspend; and meanwhile, the air inflow to the left airbag body 31 and the right airbag body 31 or the air inflow to the first cavity 33 and the second cavity 34 in each airbag body 31 can be changed to adjust the underwater attitude of the robot and to achieve six-degree-of-freedom underwater motions of the robot.

Particularly, the operating module 6 comprises a submarine adaptive collector (not shown), water suction tubes 61, and a plurality of mineral inlets 62, wherein the plurality of mineral inlets 62 are formed in the head of the collection box 2 and are communicated with the collection box 2, and the submarine adaptive collector is connected with the mineral inlet 62 through the water suction tubes 61. Telescopic adjustment mechanisms are arranged at the mineral inlets 62 and are connected with the water suction tubes 61 to adjust the length of the water suction tubes 61. The telescopic adjustment mechanisms in the invention can accurately launch the submarine adaptive collector to a specified position and can prevent the water suction tubes 61 from intertwining. In this embodiment, the telescopic adjustment mechanisms are common length control mechanisms in the prior art, such as reset springs. The propelling mechanism 7 comprises propellers 71 symmetrically arranged on the two sides of the tail of the collection box 2, and the two propellers 71 are respectively connected with the two driving motors 72.

The operating module 6 and propelling mechanism 7 of the invention have the following functions: (1) the propelling mechanism 7 is used to provide power for the motions of the robot and to provide a suction force for the operating module 6 to collect and extract minerals; (2) the operating module 6 is used for storing minerals collected by the submarine adaptive collector; and (3) the water suction tubes 61 can be disassembled according to actual work requirements, so that minerals are directly collected into the collection box 2, or the propellers 71 are rotated reversely to discharge sewage.

Preferably, a filter screens 21 is arranged in the collection box 2 to prevent minerals from entering the tail of the collection box 2, which may otherwise damage the propellers 71. The material and number of meshes of the filter screen 2 can be changed to collect different minerals or other submarine resources.

Particularly, a horizontal platform 22 is arranged on the head of the collection box 2, a mechanical arm 23 which has six degrees of freedom is arranged on the horizontal platform 22, and a mechanical gripper and/or a camera are/is connected to the suspension end of the mechanical arm 23.

The mechanical arm 23 in the invention has the following functions: (1) to clamp the camera to fulfill all-directional and wide-angle underwater photography; (2) to remove obstacles by means of the mechanical gripper.

Preferably, a position finder 24 and an attitude sensor 25 are mounted on the collection box 2, and the position finder 24 is able to transmit the position and movement speed of the robot to the control mechanism 4 in real time; and a three-axis gyroscope and a tri-axial accelerometer are arranged in the attitude sensor 25 to reflect the motion attitude, acceleration, and angular acceleration of the robot in time.

A working method of the multi-functional underwater robot comprises the following steps:

S1: the two-way air valves 35 of all the adjustable buoyant airbags are opened to allow air to enter the adjustable buoyant airbags until the buoyancy of the robot is slightly lower than the gravity of the robot, so that the robot is able to dive at a low speed;

S2: the diving speed and attitude of the robot are adjusted;

S3: the propellers 71 are started and are then controlled to rotate forward or in reverse or to rotate at a variable speed to control the robot to advance, retreat, or steer until the robot reaches a specified submarine mining area;

S4: when the robot arrives at the seabed, the driving motors are shut down, the propellers stop rotating, and then the traveling mechanisms are started to drive the robot to continuously and stably advance on the seabed through the track wheel devices;

S5: the mechanical arm 23 is started to control the mechanical gripper to pick up stones or other impurities on minerals and then to place the stones or other impurities in a specified position;

S6: after the impurities in the mining area are removed, the water suction tubes 61 and the submarine adaptive collector are launched to a specified position, and then the driving motors 72 are started to drive the propellers 71 to rotate at a high speed to generate a great suction force to collect minerals into the collection box 2; as for large granular minerals which cannot be collected by the submarine adaptive collector, the water suction tubes 61 can be disassembled before work, so that to-be-collected minerals are clamped directly by the mechanical gripper in work and are then placed to the mineral inlets 62, and afterwards, the mechanical gripper is released, so that the minerals are collected into the collection box 2; and S7: The minerals are conveyed by a pulp pump into a buffer compartment, and the robot ascends after one working cycle is completed or the working system is shut down.

Due to the fact that the seawater pressure increases gradually in the diving process, the two-way air valves 35 need to be properly opened to keep the volume of the airbag bodies 31 constant so as to ensure continuous diving of the robot, and the diving speed is determined according to the position finder 24; and the air inflow of part of the airbags can be appropriately increased according to the longitudinal inclination and horizontal inclination of the attitude sensor 25 to keep the robot in an upright condition.

Embodiment 2

The traveling mechanism in this embodiment differs from that in Embodiment 1 in the following aspect: the tracks on the left side and the right side of the robot are respectively divided into a front unit and a rear unit.

Figure 7:
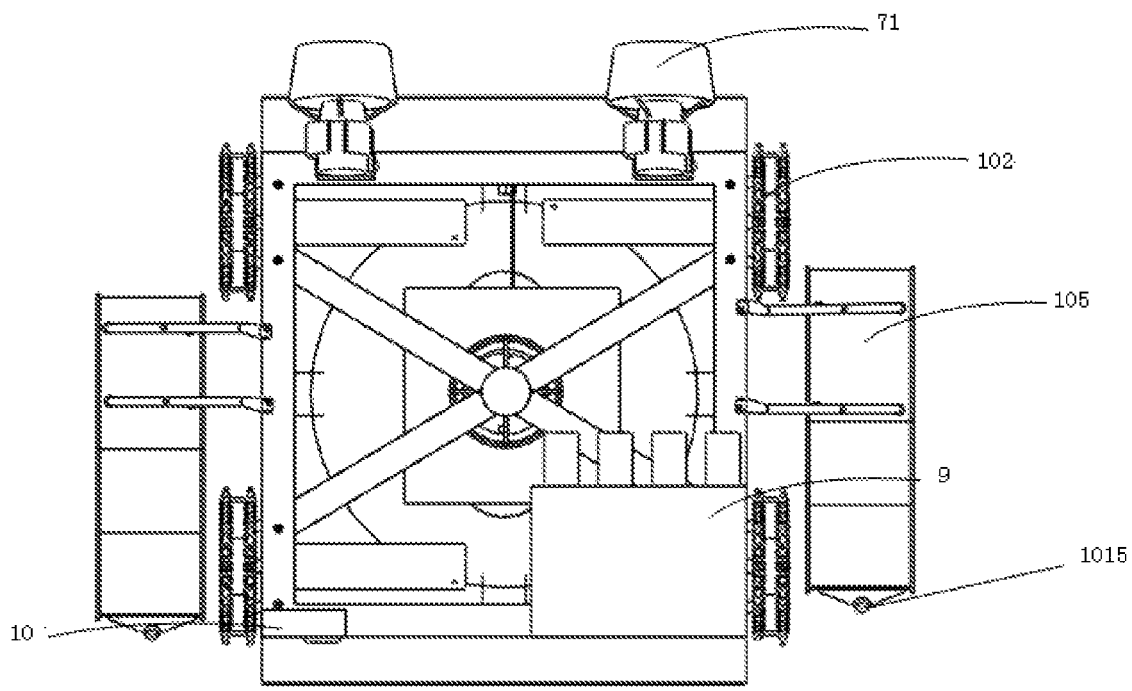
FIG. 7 is a top view of the underwater robot in Embodiment 2.
Figure 8:
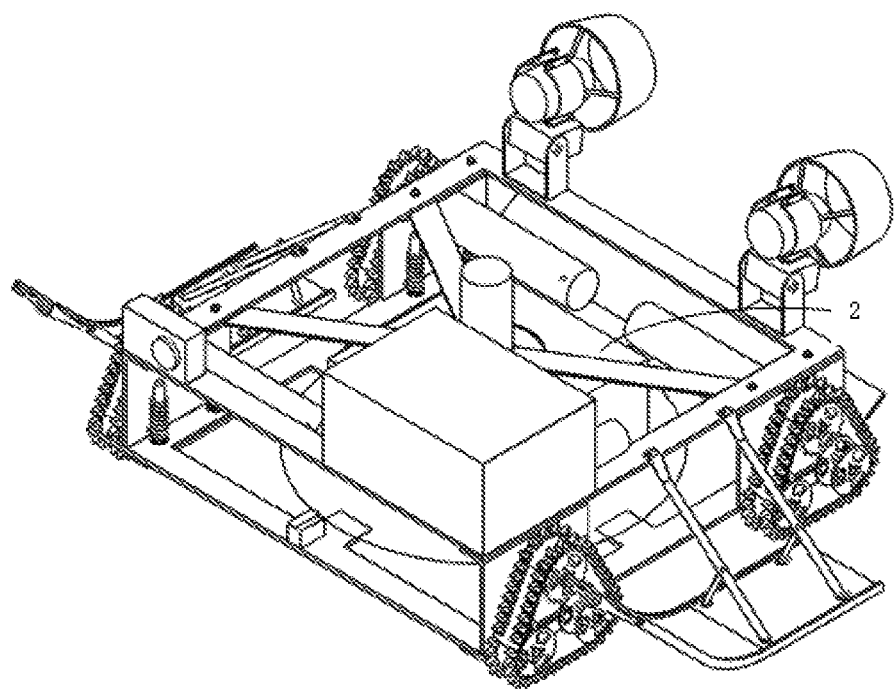
FIG. 8 is a perspective view of the underwater robot in Embodiment 2.
Figure 9:
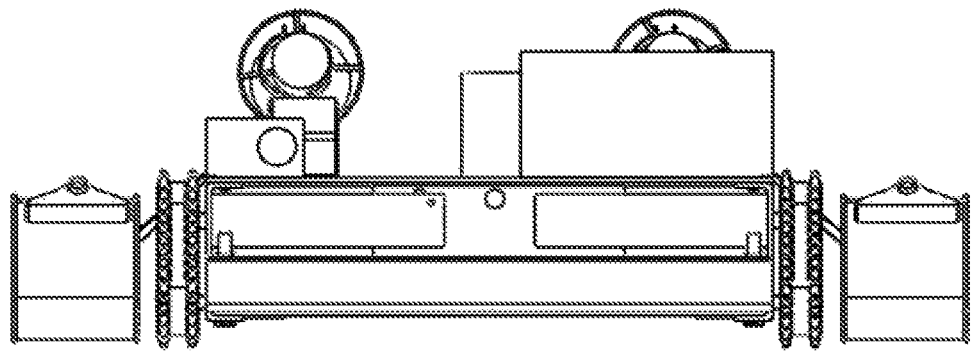
FIG. 9 is a front view of the underwater robot in Embodiment 2.
Figure 10:
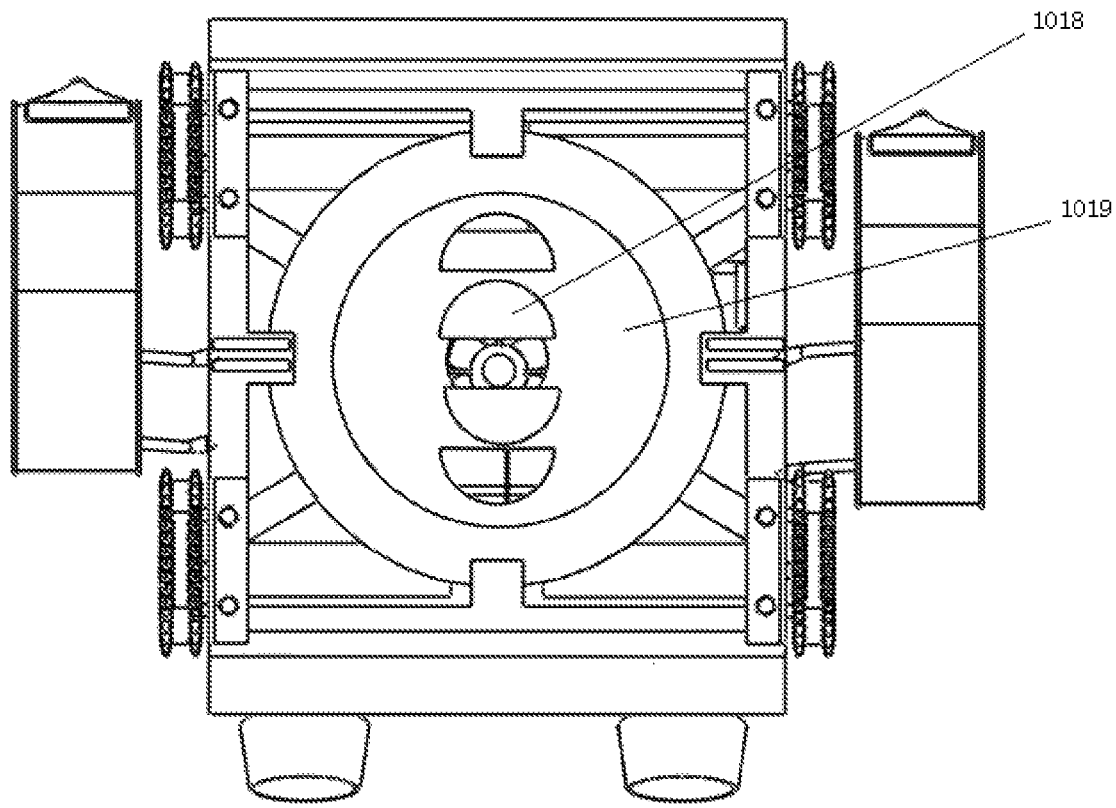
FIG. 10 is a bottom view of the underwater robot in Embodiment 2.
Figure 12:
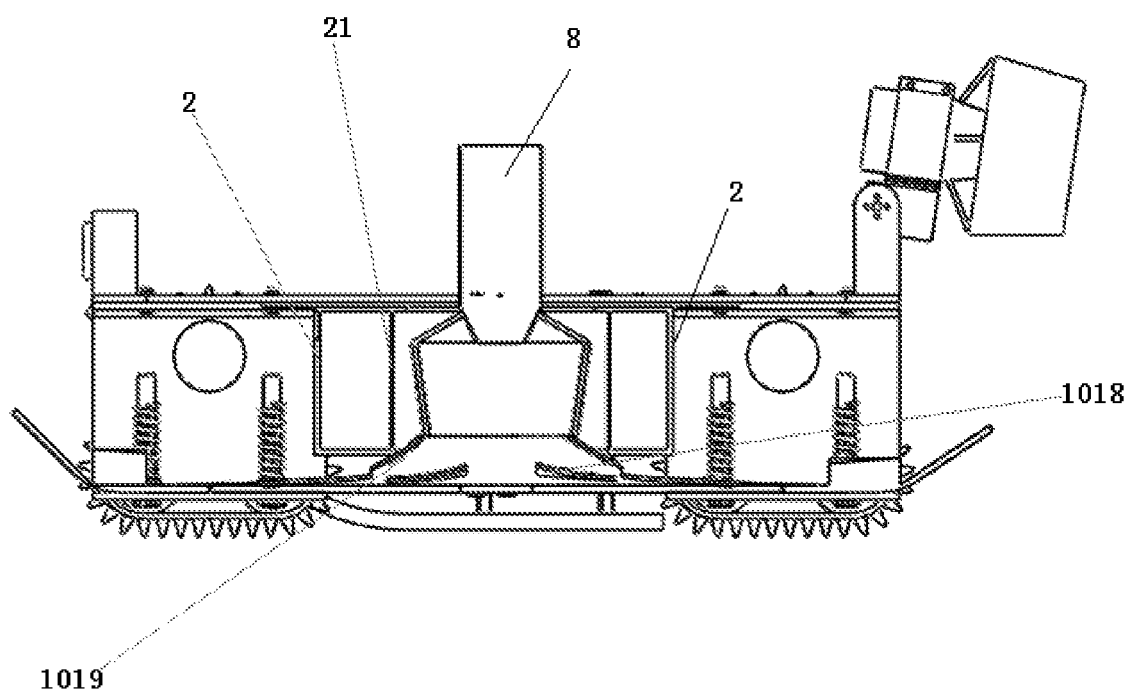
FIG. 12 is a left sectional view of the underwater robot in Embodiment 2.

This embodiment is identical with Embodiment 1 in design idea and structure and can fulfill all the functions of Embodiment 1. On this basis, this embodiment further adopts other designs which are particularly illustrated as follows:

Referring to FIG. 7, FIG. 10, and FIG. 12, a flared opening which becomes larger gradually from top to bottom is formed in the center of a chassis of the robot, the collection box 2 is an of annular structure in which a columnar space is defined, a water inlet is formed in the upper end of the columnar space, a water outlet is formed in the lower end of the columnar space, and a propeller 8 is arranged at the water inlet to guide water into the columnar space; and a slightly-tilted baffle plate 1018 is fixedly arranged below the columnar space, and under the effect of the baffle plate 1018, water can flow out along the small-curvature chassis in the water outflow direction of the water outlet to form a water film between the chassis and sea mud. In this way, the chassis can bear a large pressure, subsidence is reduced, and the advancing resistance is greatly reduced. Identical with Embodiment 1, mud sled structures are additionally arranged on the two sides of each track in this embodiment, so that the wall attachment effect of the water flow is better used, wherein the wall attachment effect refers to the tendency of fluid (water flow or air flow) to change the original flow direction to flow along the surface of a convex object. As long as the curvature of the object is not excessively large, the fluid can flow along the surface of the object due to the presence of surface friction between the fluid and the surface of the object. Therefore, the invention further has the following advantages: the structure of the robot is simplified, the width of the robot is reduced, the structural strength of the robot is improved, and the robot can pass through a narrow region more easily. Meanwhile, water discharged out of the collection box is used to form a stable water film on the surface of the mud sleds at the flared opening, and through such ingenious design, energy consumption of the system is reduced.

The propeller 8 is designed to fulfill the following multiple functions:

1) To provide floating power for the robot;

2) To provide a thrust for the robot in multiple directions once subsidence occurs when the robot advances on the seabed, so as to draw the robot out of mud;

3) Due to the fact that the propeller is arranged at the center of the robot, the propeller can provide a vertical lift force; meanwhile, the propeller is located at the center of the collection box, so that the propeller can serve as a water pump in the water collection box to continuously discharge water out of the collection box under the effect of a negative pressure generated by the water flow, so that an auxiliary collection force is applied to the water inlet end of the collection box to collect trepang, mineral grains, and various samples underwater; the structure of the robot is simplified, and the manufacturing cost of the robot is reduced; the filter screen arranged in the collection box insulates substances collected from the guide-tube spiral propeller, so that both blades and substances collected are protected.

Figure 11:
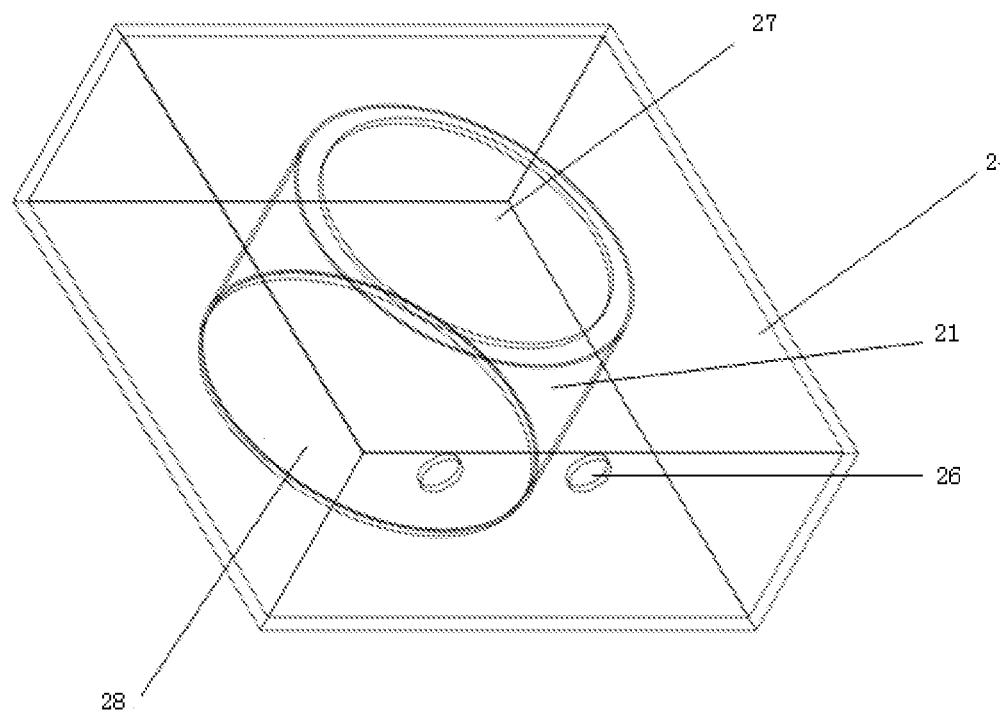
FIG. 11 is a structural diagram of a collection box of the underwater robot in Embodiment 2.

In this embodiment, as shown in FIG. 11 and FIG. 12, the filter screen 21 is arranged on the inner wall of the annular collection box 2, and collection ports 26 are formed in the outer wall of the collection box 2; and during collection, water flows out along the small-curvature chassis under the effect of the baffle plate 1018 after flowing out along the inner wall of the collection box 2, so that the water film formed between the chassis and the sea mud is further reinforced.

In this embodiment, as shown in FIG. 10 and FIG. 12, the baffle plate 1018 can be freely opened or closed to shield the water outlet to different degrees and to adjust the water outflow direction to maintain a stable water jet flow rate between the chassis of the robot and the sea mud under different water discharge conditions of the collection box, and thus, the quality of the water film is kept stable.

In this embodiment, distance sensors and image recognition sensors are arranged at the collection ports 26, and flowmeters are arranged in collection tubes connected with the collection ports 26; after image recognition, the control system reads the geometrical characteristics of collected objects so as to figure out the attributes and categories of the objects and to obtain sizes and volumes of the collected objects, the weight and buoyancy of the objects are worked out according to the categories of the objects, and the minimum suction force is figured out according to the difference between the weight and the buoyancy; and afterwards, the control system adjusts the distance from the collection tubes to the collected objects and the flow rate in the collection tubes to dynamically adjust the suction force of the collection tubes to the objects under different working conditions, so that the suction force is kept close to the minimum suction force (the difference between the gravity and the buoyancy) required to collect the object, so that the object can be exactly and accurately collected into the collection box. By adoption of the optimum control method, energy consumption and disturbances on the underwater environment can be greatly reduced, the collection rate of objects is ensured, and an advanced technical support is provided for suction force prediction and accurate environmental-protection operations in the complex underwater environment. This function is not shown in the figures.

Submarine environmental protection is a major issue needing to be settled at present, and the technical key to settle this issue is how to realize accurate acquisition of submarine samples (namely how to reduce energy consumption and disturbances on the seabed while the acquisition rate is guaranteed). The applicant has carried out experiments according to the above method, and experimental results show that accurate prediction of the collection force under different working conditions is realized. Particularly, a sphere provided with a force sensor at the lower end is used as a to-be-collected object, the diameter of the sphere, the diameter of the collection tube, and the relative geometric positions between the collection tube and the sphere are changed continuously, the mapping relation between the collection force and these geometric parameters is established, and then, a suction force prediction formula used for predicting the collection force in real time is obtained. This formula can provide support for intelligent and accurate submarine work of the robot and is an important basis for optimizing and regulating the flow rate in the collection tube and the relative position between the collection tube and the sphere.

Embodiment 2 of the two embodiments mentioned above is a preferred embodiment. Various transformations or improvements can be made by those ordinarily skilled in the art without deviating from the conception of the invention, and all these transformations or improvements should also fall within the protection scope of the invention.

What is claimed is:

1. A tracked robot, comprising:
   traveling mechanisms, wherein the traveling mechanisms comprise tracks, a mud sled structure being fixedly arranged on a side of each track, and wherein each mud sled structure is provided with an arched plate head; wherein each arched plate head is provided with plate water-jet devices capable of spraying water; and in a traveling process of the traveling mechanisms, each arched plate head presses water downwards to form a water film at the bottoms of the mud sled structure together with water sprayed by the plate water-jet devices.

2. The tracked robot according to claim 1, wherein track shoes are arranged on the tracks, and track water-jet devices are fixedly arranged on the tracks.

3. The tracked robot according to claim 2, wherein each mud sled structure further comprises arched plate tails, and the plate water-jet devices are mounted on the arched plate heads.

4. The tracked robot according to claim 1, wherein the tracked robot further comprises a support beam and a power mechanism, wherein the traveling mechanisms are arranged on two sides of the support beam.

5. The tracked robot according to claim 4, wherein the power mechanism comprises a waterproof motor case and an electrical cabinet.

6. The tracked robot according to claim 1, wherein each track comprises a rubber track body, track shoes, a plurality of track rollers, a driving gear, a guide wheel assembly, traveling mechanism side panels, and track water-jet devices, wherein the rubber track body is connected with the track shoes.

7. The tracked robot according to claim 1, wherein:
   the tracked robot further comprises a collection box, a floating mechanism and a control mechanism, the collection box is arranged on the tracks, an operating module and a propelling mechanism are respectively arranged on a head and a tail of the collection box, the operating module is used for collecting minerals and then conveying the minerals into the collection box, the floating mechanism comprises a plurality of adjustable buoyant airbags which are horizontally and symmetrically distributed at a top of the collection box.

8. The tracked robot according to claim 7, wherein each adjustable buoyant airbag comprises an airbag body and a membrane arranged in a middle of an interior of the airbag body and dividing an inner cavity of the airbag body into a first cavity and a second cavity, wherein two-way air valves are arranged at the first cavity and the second cavity and are connected with the control mechanism.

9. The tracked robot according to claim 8, wherein the airbag body comprises nylon.

10. A method of operating the tracked robot according to claim 8, the method comprising:
    S1: opening the two-way air valves of the plurality of adjustable buoyant airbags to have a buoyancy of the robot lower than a gravity of the robot;
    S2: adjusting a diving speed and an attitude of the robot;
    S3: starting propellers, controlling the propellers to rotate forward or in reverse or to rotate at a variable speed to enable the robot to advance, retreat or steer to reach a specified submarine mining area;
    S4: shutting down driving motors when the robot arrives at a seabed, stopping the propellers, and starting the traveling mechanisms to enable the robot to advance on the seabed;
    S5: starting a mechanical arm, and controlling a mechanical gripper.

11. The method according to claim 10, wherein S2 comprises: opening the two-way air valves to allow air to enter the airbag body, wherein the diving speed is determined according to a position finder.

12. The tracked robot according to claim 7, wherein the operating module comprises a submarine adaptive collector, water suction tubes, and a plurality of mineral inlets formed in the head of the collection box and communicated with the collection box, and the submarine adaptive collector is connected with the plurality of mineral inlets via the water suction tubes.

13. The tracked robot according to claim 12, wherein telescopic adjustment mechanisms are arranged at the plurality of mineral inlets and are connected with the water suction tubes to adjust a length of the water suction tubes.

14. The tracked robot according to claim 13, wherein the propelling mechanism comprises two propellers symmetrically arranged on two sides of the tail of the collection box and respectively connected with two driving motors, and a filter screen is arranged in the collection box.

15. The tracked robot according to claim 7, wherein a horizontal platform is arranged on the head of the collection box and is provided with a mechanical arm, and a mechanical gripper.

16. The tracked robot according to claim 15, wherein a position finder and an attitude sensor are mounted on the collection box, and the attitude sensor comprises a gyroscope and an accelerometer.

17. The tracked robot according to claim 7, wherein a flared opening is positioned in a center of a chassis of the robot, the collection box is of an annular structure in which a columnar space is defined, a water inlet is formed in an upper end of the columnar space, a water outlet is formed in a lower end of the columnar space, and a propeller is arranged at the water inlet to guide water into the columnar space; and a baffle plate is fixedly arranged below the columnar space.

18. The tracked robot according to claim 17, wherein a filter screen is arranged on an inner wall of the collection box, and collection ports are formed in an outer wall of the collection box.

19. The tracked robot according to claim 18, wherein distance sensors and image recognition sensors are arranged at the collection ports, and flowmeters are arranged in collection tubes connected with the collection ports.

* * * * *